No. 862,650. PATENTED AUG. 6, 1907.
J. MÜLLER.
POLYCYCLE.
APPLICATION FILED MAR. 27, 1907.
2 SHEETS—SHEET 2.
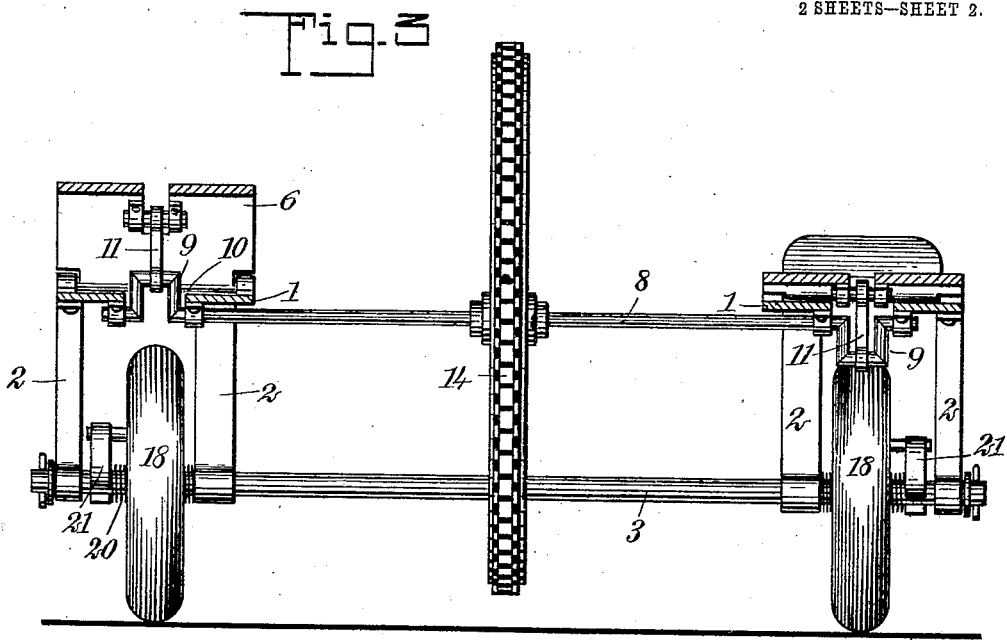
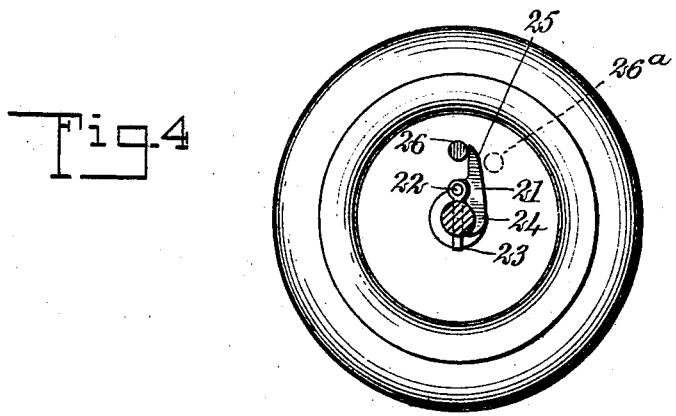
WITNESSES
INVENTOR
John Müller
BY
ATTORNEYS

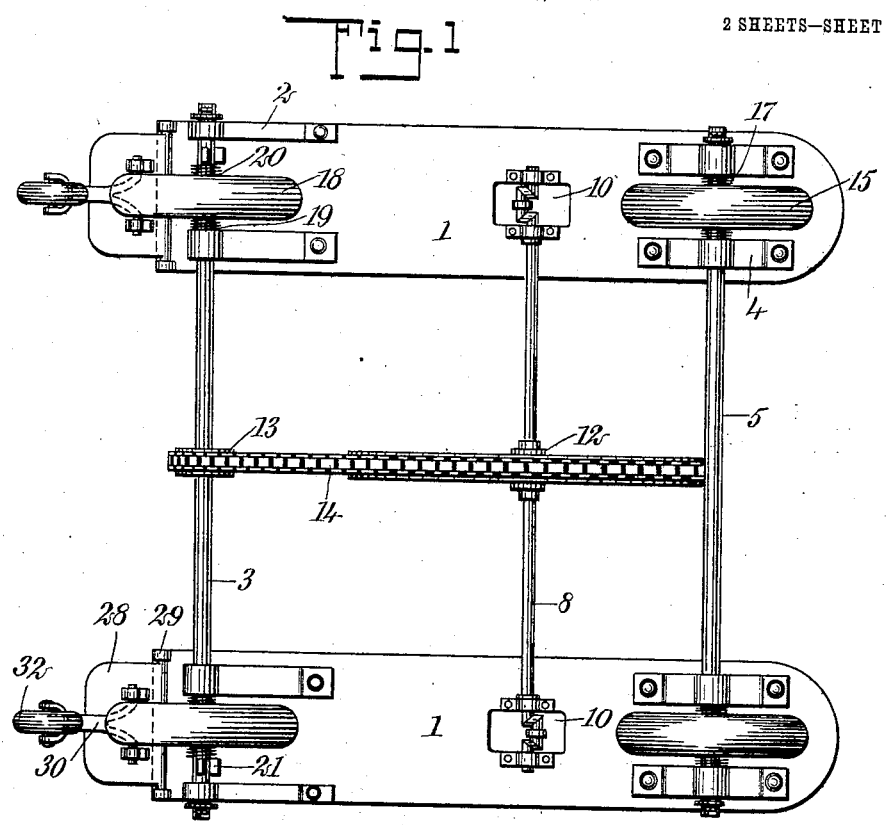

UNITED STATES PATENT OFFICE.

JOHN MÜLLER, OF NEW YORK, N. Y.

POLYCYCLE.

No. 862,650.     Specification of Letters Patent.     Patented Aug. 6, 1907.

Application filed March 27, 1907. Serial No. 364,767.

*To all whom it may concern:*

Be it known that I, JOHN MÜLLER, a subject of the Emperor of Austria-Hungary, and a resident of the city of New York, borough of Manhattan, in the county and State of New York, have invented a new and Improved Polycycle, of which the following is a full, clear, and exact description.

This invention relates to polycycles, and the object of the invention is to produce a skate which is adapted to be operated by a movement of one's foot.

A further object is to provide a construction which is simple and not likely to get out of order, and which will enable the polycycle to be steered.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a bottom plan view of a polycycle constructed according to my invention; Fig. 2 is a side elevation; Fig. 3 is a cross section taken on the line 3—3 of Fig. 1 and looking forwardly; and Fig. 4 is a cross section taken near one of the rollers and illustrating details of the driving mechanism.

Referring more particularly to the parts, 1, 1 represent a pair of oppositely disposed foot plates. To the under sides of these plates at the forward ends thereof brackets 2 are attached, and in these brackets a rotatable forward axle 3 is mounted. At the rear of the plates 1, 1 and to the under sides thereof, similar brackets 4 are attached, and in these brackets there is rotatably mounted a rear axle 5. On the upper sides of the plates 1, 1 lever plates 6 are pivotally mounted at the points 7 just forward of the middle of the plates, as indicated most clearly in Fig. 2. To the under sides of the plates 1, 1, and preferably just to the rear of the points 7, a transverse shaft 8 is rotatably mounted, and this shaft is provided near its end with cranks 9 which may extend upwardly through openings 10 formed in the plates 1, 1. These cranks 9 are connected respectively by links 11 to the under sides of the lever plates 6.

At a suitable point on the shaft 8, preferably midway between the plates 1, 1, I provide a main sprocket wheel 12, and opposite this sprocket wheel on the forward axle 3, I provide a small sprocket wheel 13, the said sprocket wheels being connected by a sprocket chain 14 of common construction.

The axle 5 is provided near its ends and beneath the plates 1, 1 with rollers 15 which will have rubber tires 16 to absorb the shock of passing over unevenness in the floor, and to enable the roller to have a better bearing.

The brackets 4 are disposed in pairs at each of the plates 1, 1, and between the brackets and the rollers 15, helical springs 17 are provided around the axle, which thrust at their inner ends against the sides of the rollers and tend to hold the same in mid position between the brackets, as shown in Fig. 1. Similar rollers 18 are provided at the forward ends of the plates 1, 1, and these rollers are held between springs 19 and 20 similar to the springs 17. The springs 20, however, do not thrust against the outer members of the brackets 2, but thrust against driving pawls 21. There is one of these driving pawls in connection with each of the forward rollers 18. The construction and arrangement at this point is clearly shown in Fig. 4. Each of the pawls 21 is mounted pivotally at 22 upon a pin 23 which is fixed transversely in the axle 3. Each pawl 21 is provided with a tail 24 which normally lies against the side of the axle. Each pawl is further formed with an outwardly projecting toe 25, and this toe is adapted to engage with a pin 26 which projects laterally from the side face of the corresponding roller as indicated very clearly in Figs. 3 and 4. The toe 25 projects in the direction in which the rotation of the axle takes place when the polycycle is moving forwardly; from which arrangement it follows that if the rotation of the axle should be suddenly arrested, the roller may continue to rotate. When the pin 26 arrives at the position $26^a$, in which it is indicated in dotted lines in Fig. 4, it simply strikes the toe of the pawl and deflects it inwardly toward the axle. At this time, it should be understood that the pawl simply rotates on the pivot point 22 thereof. From this construction it should be understood that the forward axle may operate to rotate the forward rollers, but the rollers may advance at a greater rate of speed than the axle, in turning curves or the like. Hence, the connection between the forward axles and the forward rollers may be considered to constitute a one-way clutch.

At the forward ends of the plates 1, 1, downwardly projecting hangers 27 are provided, and these hangers support pivotally steering plates 28, which extend upwardly normally in an inclined position, as indicated in Fig. 2, being held in this condition by helical springs 29 attached respectively to the plates 1, 1 and to the plates 28, as shown. To the under sides of the steering plates 28 steering arms 30 are pivotally attached respectively at 31, and these arms hang downwardly as shown, and are provided at their lower ends with steering rollers 32 respectively. When the right steering wheel is depressed against the floor, the device is steered in one direction, and when the left wheel is depressed to the floor, the device will be steered in the other direction.

In the operation of the polycycle it should be understood that the person stands upon the plates 1, 1 with his heels resting against the lever plates 6, the cranks 9 being set at 180° with respect to each other, thus affording means for rotating the shaft 8 by alternately pressing the plates 6 downwardly with the heel. In this way the forward axle 3 is rotated in a forward direction, and through the operation of the pawls 21, the rollers 18 are continuously driven in a forward direction. The toes of the skater's shoes lie adjacent to the steering plates 28 so that either of the plates 28 may be depressed at will so as to bring the roller 32 carried thereby, in contact with the ground, In this way the polycycle may be steered as desired.

The plates 1, 1 connected by the axles and the shaft and other contiguous parts, may be considered to constitute a frame supporting the running gear.

It is unnecessary to provide special fastening devices for holding the foot upon the skate, and such devices would be undesirable as tending to increase the liability to injury in case the skater should fall. After a little practice, the skater can very readily stand upon the skate and operate it in the manner set forth above.

Having thus described my invention, I claim as new and desire to secure by Letters Patent:

1. In a polycycle of the class described, in combination, a frame mounted upon rollers, a depressible steering plate attached forwardly to said frame, means for normally holding said plate in an elevated position whereby it may be depressed by the toe of one's shoe, and a steering roller supported from said steering plate and normally lying near the floor.

2. In a polycycle of the class described, in combination, a frame comprising a pair of oppositely disposed plates, axles connecting the same and carrying rollers supporting said frame, depressible steering plates attached to the forward ends of said first plates, steering wheels carried by said steering plates, and springs normally holding said steering plates in an elevated position to maintain said steering wheels out of engagement with the floor.

In testimony whereof I have signed my name to this specification in the presence of two subscribing witnesses.

JOHN MÜLLER.

Witnesses:
F. D. AMMEN,
EVERARD B. MARSHALL.